United States Patent
Okajima (10) Patent No.: US 7,110,752 B2
(45) Date of Patent: Sep. 19, 2006

(54) RADIO COMMUNICATION METHOD AND A RADIO STATION WITH SOFTWARE RECONFIGURATION FEATURES

(75) Inventor: Ichiro Okajima, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 535 days.

(21) Appl. No.: 09/926,087

(22) PCT Filed: Dec. 27, 2000

(86) PCT No.: PCT/JP00/09316

§ 371 (c)(1),
(2), (4) Date: Aug. 28, 2001

(87) PCT Pub. No.: WO01/48997

PCT Pub. Date: Jul. 5, 2001

(65) Prior Publication Data

US 2002/0160765 A1   Oct. 31, 2002

(30) Foreign Application Priority Data

Dec. 28, 1999   (JP)   .................................. 11-375792

(51) Int. Cl.
*H04M 3/00* (2006.01)
*H04M 1/00* (2006.01)
(52) U.S. Cl. ................ 455/419; 455/550.1; 455/452.2
(58) Field of Classification Search ................ 455/419, 455/414; 340/825.52
See application file for complete search history.

(56) References Cited

U.S. PATENT DOCUMENTS 5,854,978 A * 12/1998 Heidari ........................ 455/418
5,864,300 A * 1/1999 Cho et al. .............. 340/825.52
6,029,065 A * 2/2000 Shah ........................ 455/414.4
6,351,639 B1 * 2/2002 Motohashi .................. 455/420
6,633,759 B1 * 10/2003 Kobayashi .................. 455/419
6,671,509 B1 * 12/2003 Tanaka et al. .............. 455/419

FOREIGN PATENT DOCUMENTS

JP   9-186736   7/1997
WO   WO 96/14719   5/1996

OTHER PUBLICATIONS

Joe Mitola, IEEE Communications Magazine, vol. 33, No. 5, pp. 26-38, "The Software Radio Architecture", May 1995.
H. Yoshida, et al., Toshiba Review, vol. 54, No. 4, pp. 52-55, "Software Musenki", Apr. 1999 (submitting English translation only).
C. Noblet, et al., "Assessing the Over-the-Air Software Download for Reconfigurable Terminal", The Institution of Electrical Engineers, XP-006506620, Feb. 6, 1998, pp. 6-1-6-6.

* cited by examiner

*Primary Examiner*—Fan Tsang
*Assistant Examiner*—Lisa Hashem
(74) *Attorney, Agent, or Firm*—Oblon, Spivak, McClelland, Maier & Neustadt, P.C.

(57) ABSTRACT

A radio communication station and method of communications between two radio stations, uses information about the radio communication methods each radio station is equipped to use, such that software used to reconfigure a station is exchanged mutually between the two radio stations by conveying the software according to a predetermined first radio communication method. The radio communication method is suitable for a communication application to be conveyed after the application is selected, where at least one of the two radio stations is equipped with the application as the second radio communication method. Software is transmitted to the radio station that is not equipped with the second radio communication method so it can perform the requisite processing.

10 Claims, 5 Drawing Sheets

LIST OF COMMUNICATION APPLICATIONS AND COMMUNICATION QUALITY:

| | COMMUNICATION QUALITY REQUIRED BY COMMUNICATION APPLICATIONS | | | |
|---|---|---|---|---|
| | REQUIRED COMMUNICATION SPEED (bps) TO BE EQUAL TO OR HIGHER THAN | REQUIRED TRANSMISSION DELAY (seconds) TO BE EQUAL TO OR LESS THAN | REQUIRED PACKET ERROR RATE (%) TO BE EQUAL TO OR LESS THAN | REQUIRED PACKET LENGTH (bytes) TO BE EQUAL TO OR MORE THAN |
| COMMUNICATION APPLICATION 1 | COMMUNICATION SPEED 1 | TRANSMISSION DELAY 1 | PACKET ERROR RATE 1 | PACKET LENGTH 1 |
| COMMUNICATION APPLICATION 2 | COMMUNICATION SPEED 2 | TRANSMISSION DELAY 2 | PACKET ERROR RATE 2 | PACKET LENGTH 2 |
| COMMUNICATION APPLICATION 3 | COMMUNICATION SPEED 3 | TRANSMISSION DELAY 3 | PACKET ERROR RATE 3 | PACKET LENGTH 3 |
| ... | ... | ... | ... | ... |
| COMMUNICATION APPLICATION M | COMMUNICATION SPEED M | TRANSMISSION DELAY M | PACKET ERROR RATE M | PACKET LENGTH M |

FIG.3

LIST OF RADIO COMMUNICATION METHODS AND COMMUNICATION QUALITY:

| | | COMMUNICATION QUALITY AVAILABLE FROM COMMUNICATION METHODS | | | |
|---|---|---|---|---|---|
| | | REQUIRED COMMUNICATION SPEED (bps) TO BE EQUAL TO OR HIGHER THAN | REQUIRED TRANSMISSION DELAY (seconds) TO BE EQUAL TO OR LESS THAN | REQUIRED PACKET ERROR RATE (%) TO BE EQUAL TO OR LESS THAN | REQUIRED PACKET LENGTH (bytes) TO BE EQUAL TO OR MORE THAN |
| KINDS OF COMMUNICATION METHOD SOFTWARE | RADIO COMMUNICATION METHOD 1 | COMMUNICATION SPEED 1 | TRANSMISSION DELAY 1 | PACKET ERROR RATE 1 | PACKET LENGTH 1 |
| | RADIO COMMUNICATION METHOD 2 | COMMUNICATION SPEED 2 | TRANSMISSION DELAY 2 | PACKET ERROR RATE 2 | PACKET LENGTH 2 |
| | RADIO COMMUNICATION METHOD 3 | COMMUNICATION SPEED 3 | TRANSMISSION DELAY 3 | PACKET ERROR RATE 3 | PACKET LENGTH 3 |
| | ... | ... | ... | ... | ... |
| | RADIO COMMUNICATION METHOD N | COMMUNICATION SPEED N | TRANSMISSION DELAY N | PACKET ERROR RATE N | PACKET LENGTH N |

FIG.5

RADIO COMMUNICATION METHOD AND A RADIO STATION WITH SOFTWARE RECONFIGURATION FEATURES

TECHNICAL FIELD

This invention relates to radio communication methods and radio stations, and particularly relates to a radio communication method for communicating between radio stations by a radio communication method that is suitable for communication applications.

Further, this invention relates to a radio station that communicates with other radio stations according to such a radio communication method.

BACKGROUND TECHNOLOGY

Figure 5:
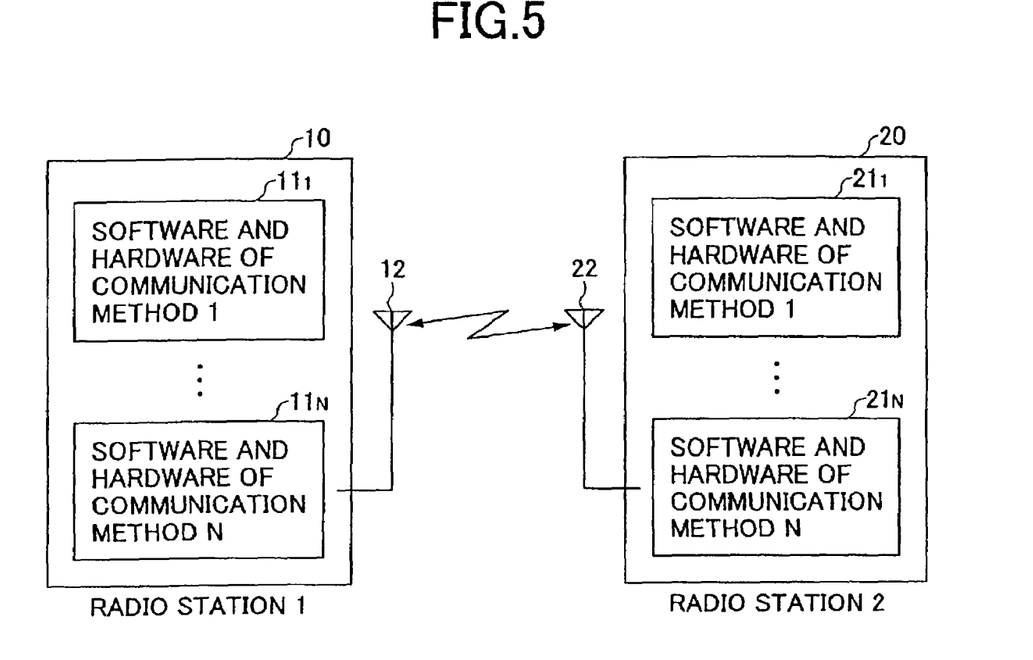
FIG. 5 shows an example of a conventional radio communications system.

A block diagram of a conventional radio communications system is shown in FIG. 5.

There have been only a few kinds of communication applications used in conventional radio communications systems. Therefore, each of radio stations 10 and 20 in a conventional radio communications system has been equipped with a fixed set of hardware and software $11_i$ and $21_i$ (i=1, 2, - - - , N), which implements a radio communication method that satisfies communication quality required for each communication application.

Here, the communication application refers to software for exchanging information with other equipment and processing the information, and is situated at a higher layer in the radio communication method. That is, the communication application of a radio station has a function to process information followed by exchanging the information with another communication application of the same kind that is installed in another radio station through a communication path that is provided by the radio communication method. Communication applications for audio communication, communication applications for image communication, communication applications for email, communication applications for file transfer, communication applications for web communication, and the like are known as such communication applications, for example.

The radio communication method is positioned at a lower layer in the above-mentioned communication application, providing the communication path for radio communications conducted between radio stations. Specifically, a radio communication method is defined as a set of various parameters, such as a radio wave frequency to be used, a frequency bandwidth, a modulation method, a multiplexing method, a coding and decoding method, an error correction method, a radio channel structure, a data transmission format, and a communication protocol indicating a data communication procedure. And this radio communication method offers the communication path for the radio communications to be made according to such various parameters.

Namely, in the conventional radio communications system, when the communication application for voice communication and the communication application for message communication, for example are used, a radio station of the radio communications system is equipped with hardware and software for the radio communication method (radio channel structure, communication protocol and the like) for offering a communication path that satisfies communication quality demanded of the communication application for the voice communication, and hardware and software for the radio communication method (radio channel structure, communication protocol and the like) for offering a communication path that satisfies a communication quality demanded of the communication application for the message communication.

Further, since the radio station is equipped with such hardware and software fixed, they are not changed after manufacture of the radio station.

By the way, kinds of communication applications used in a radio communications system have been increasing in recent years with versatile information presented to radio communications. In such a situation, a radio station has been required to install hardware and software corresponding to many radio communication methods to be capable of handling numerous communication applications. In this case, if a radio station shall be pre-equipped with both the hardware and software corresponding to these radio communication methods like before, cost of the radio station will increase.

Furthermore, since it is rare that a user needs all kinds of the communication applications, the hardware and software corresponding to radio communication methods for unnecessary communication applications become useless.

These problems can be solved by software radio technology. The software radio technology is the technology by which hardware independent of radio communication methods and software dependent of radio communication methods realize various radio communication methods. If the radio station is equipped with the hardware independent of radio communication methods in this way, an addition of a new function and a change in a radio communication method (for example, modulation method) can be realized by downloading new software for the addition of the function and the change from a network and the like (refer to JP, 11-346186, for example).

However, with the above conventional technology, the software of a radio communication method has had to be distributed to a terminal from the network side. That is, distribution of the software of a radio communication method has been made only from a fixed station.

For this reason, unless the network side is equipped with software of a new radio communication method, communications according to the new radio communication method between the network and the terminal cannot be performed even if the terminal attempts to communicate with the network according to the radio communication method after the terminal downloads software of the new radio communication method from other nets (Internet and the like), for example.

Further, the radio station (a station on the network side) that is supposed to communicate with many radio stations (terminals) for various communication applications pursuant to user demands must anticipate beforehand and equip itself with sets of software for variety of radio communication methods suitable for various communication applications. Furthermore, it cannot communicate with a radio station at all if a communication is requested in a radio communication method suitable for a communication application, which is not prepared.

DISCLOSURE OF THE INVENTION

Accordingly, it is a general object of this invention to provide a new and useful radio communication method and a radio station which solve one or more of the problems of the conventional technology mentioned above.

The particular object of this invention is to provide the radio communication method which enables a radio station to easily communicate with other radio stations according to various radio communication methods, even if the other radio stations are not equipped with the software of various radio communication methods beforehand.

The objects of the present invention are achieved by a radio communication method for communications between two radio stations, the method including mutually exchanging information between said two radio stations about one or more radio communication methods with which each radio station is equipped as software by communicating according to a first radio communication method defined beforehand, selecting a second radio communication method suitable as a communication application to be used for communication between said two radio stations from among the one or more radio communication methods with which at least one of the two radio stations is equipped based on the information about the one or more radio communication methods with which each radio station is equipped, transmitting software of the second radio communication method from a radio station equipped with the second radio communication method to a radio station which is not equipped with the second radio communication method according to said first radio communication method, when only one of said radio stations is equipped with the second radio communication method, and conducting communications between said two radio stations by the communication application according to said second radio communication method based on said software.

Further, another object of this invention is to provide a radio station that is capable of communicating with other radio stations according to the radio communication methods as described above.

The object of this invention is achieved by a radio station having hardware independent of a radio communication method and controlling radio communications means based on software of a radio communication method for communicating with a partner radio station by a communication application according to the radio communication method, including a memory means of storing software for one or more radio communication methods, an information exchange control means of mutually exchanging information relative to radio communication methods which the radio station has as software with the partner radio station through communications according to the predetermined first radio communication method, a radio communication method selection means of selecting a second radio communication method as the communication method suitable for the above-mentioned communication application from radio communication methods that are installed in at least one of the radio station and the above-mentioned partner radio station, a checking means of checking whether the second radio communication method mentioned above is installed in both the radio station and the partner radio station, or only one of the radio station and the partner radio station, and a software distribution control means of reading the software for the second radio communication method mentioned above from the memory means mentioned above and transferring the same to the partner radio station according to the first radio communication method mentioned above, if the checking means mentioned above has determined that the second radio communication method mentioned above is installed only in the radio station, to realize the communication with the partner radio station by the communication application mentioned above according to the second radio communication method after the software for the second radio communication method is transferred to the partner radio station by the software distribution control means mentioned above.

The above-mentioned radio station is not particularly limited as long as it performs radio communications with other radio stations. For example, it may be any one of a mobile station, a base station, and a relay station in a mobile communications system.

In addition, other purposes, features, and advantages of this invention are clarified by detailed descriptions in the following with reference to attached drawings.

THE BEST FORM EMBODIMENT OF THE INVENTION

Hereafter, an embodiment of this invention will be described based on drawings.

Figure 1:
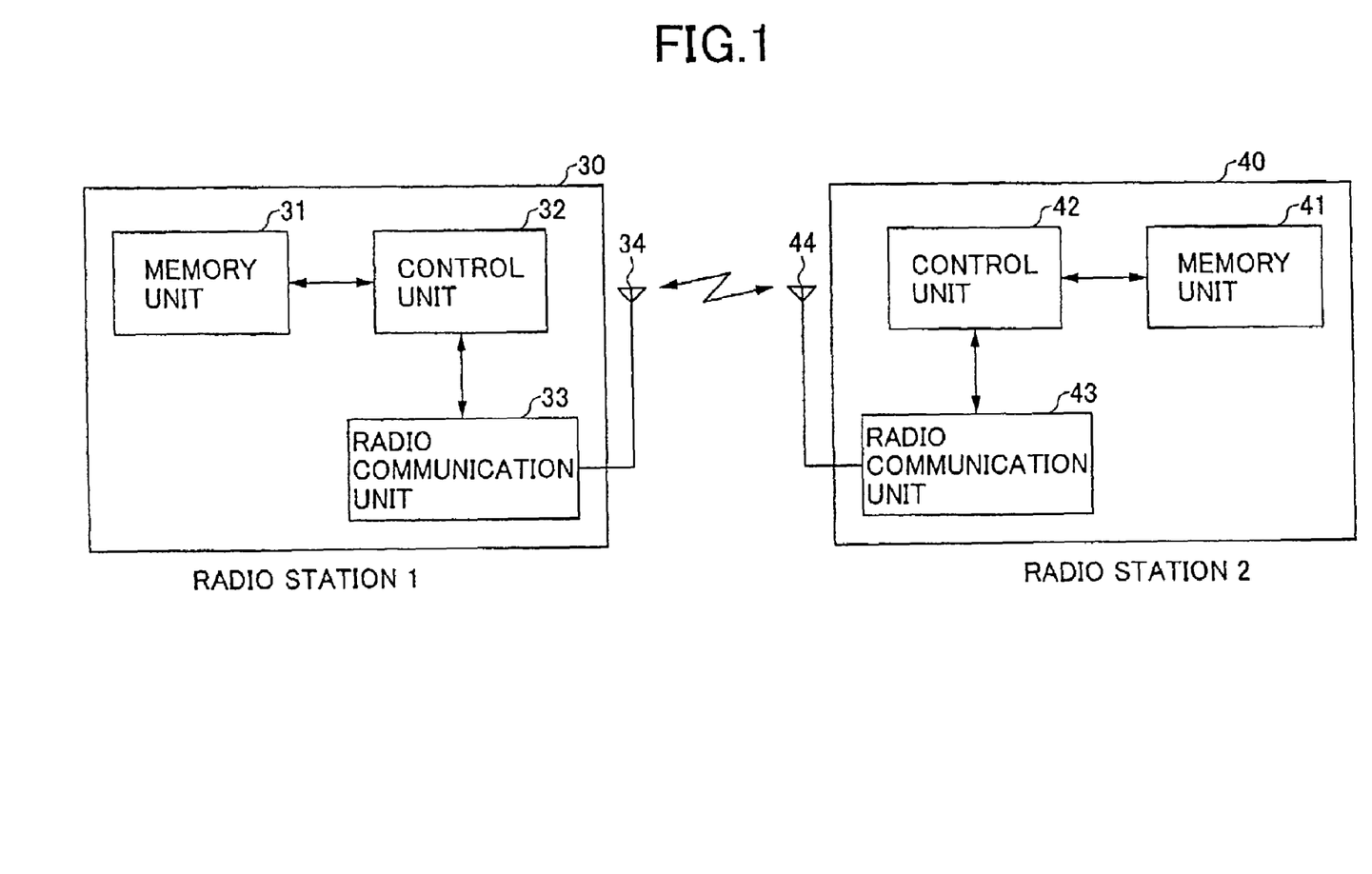
FIG. 1 shows an example of a configuration of a radio communications system with which radio communications are made according to a radio communication method concerning an embodiment of this invention.

FIG. 1 is a block diagram of the radio communications system of the embodiment of this invention, with which radio communications are made according to a radio communication method.

This radio communications system includes two radio stations 30 and 40. The radio station 30 has a control unit 32, a radio communication unit 33, a memory unit 31, and an antenna 34 connected to the radio communication unit 33. The radio station 40 on the other hand has a control unit 42, a radio communication unit 43, a memory unit 41, and an antenna 44, similarly to the above-mentioned radio station 30. Since the configuration of each of the above-mentioned radio stations 30 and 40 is identical to each other, each unit of only the radio station 30 will be described.

The control unit 32 controls the radio communication unit 33 and the memory unit 31. And this control unit 32 performs control concerning the negotiation (negotiation) for determining a radio communication method suitable for a communication application with the other radio station 40, and transfer of software of the radio communication method. The radio communication unit 33 has hardware that is independent of radio communication methods, and communicates with the radio communication unit 43 of the other radio station 40, based on processes in the control unit 32 according to the software of the radio communication method selected (software radio) as described later.

The memory unit 31 stores one or more communication applications while storing the software of one or more radio communication methods. Further, the memory unit 31 stores the communication application list (refer to FIG. 2) for managing communication quality (required communication quality), which each of the communication applications requires, and the radio communication method list (refer to FIG. 3) for managing the communication quality (the maximum communication quality), which each of the radio communication methods can offer.

Figure 2:
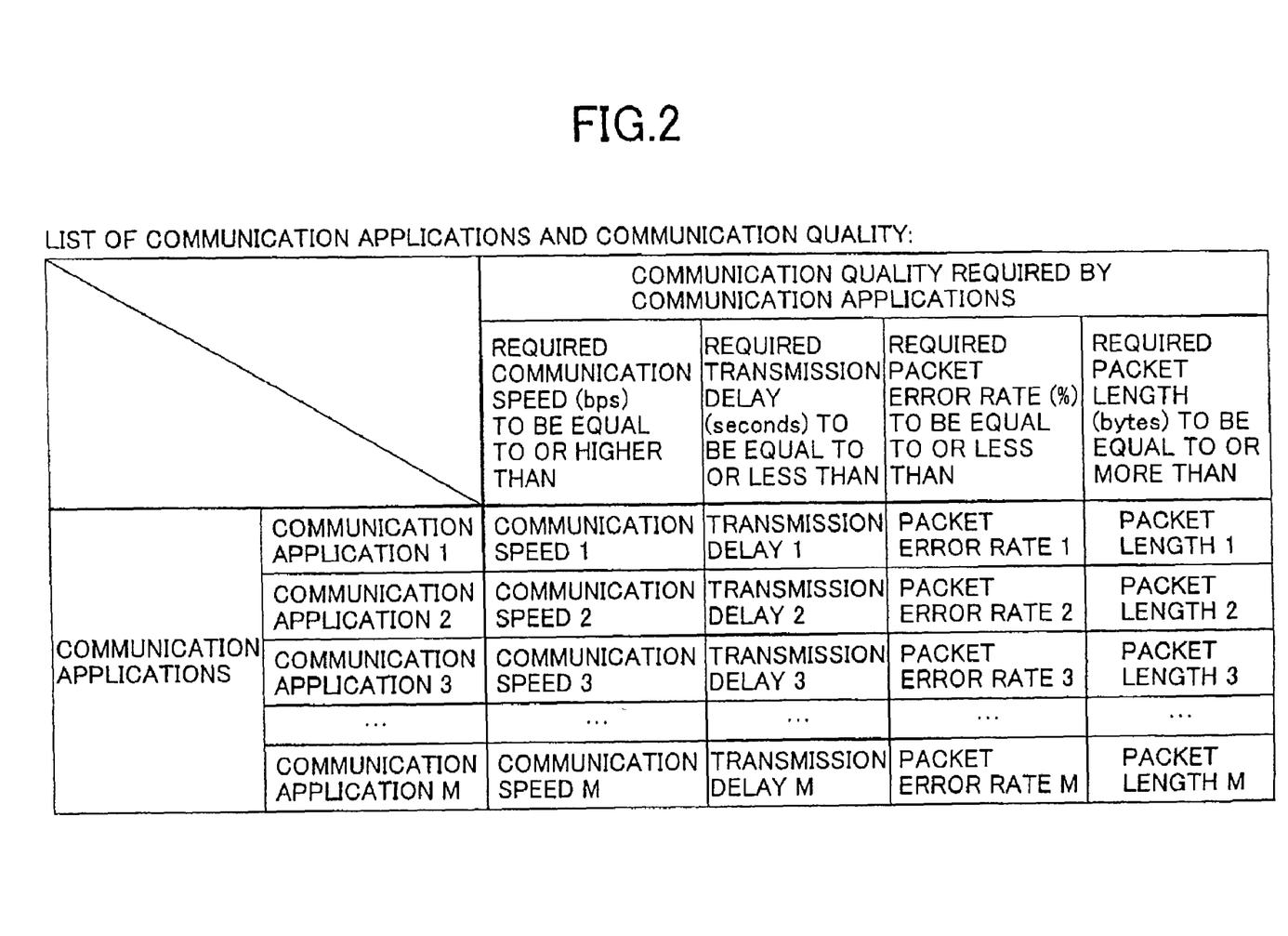
FIG. 2 shows a list of communication applications, and communication quality, with which each radio station is equipped.
Figure 3:
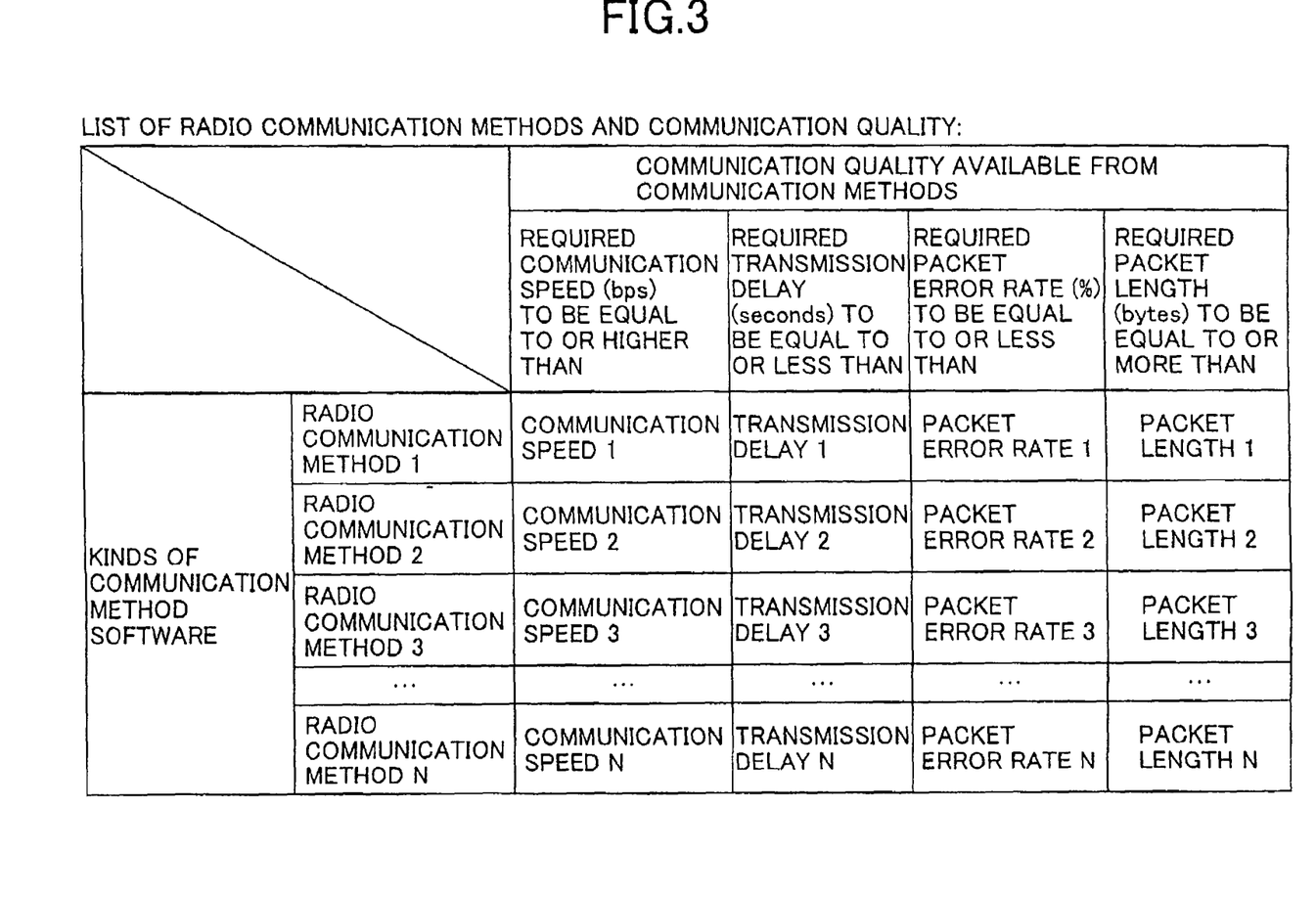
FIG. 3 shows a list of the radio communication method, and communication quality, with which each radio station is equipped.

The communication application list shown in FIG. 2 sets up each value of the required transmission speed (bits/second), required transmission delay (second), a required packet error rate (%), and required packet length (bytes) indicative of the required communication quality for each of the communication applications 1, 2, 3, through N. The radio communication method list shown in FIG. 3 sets up each value of the maximum transmission speed (bits/second), the maximum transmission delay (second), the maximum packet error rate (%), and the maximum packet length (byte) indicative of the communication quality available of each of the radio communication methods 1, 2, 3, through N.

Figure 4:
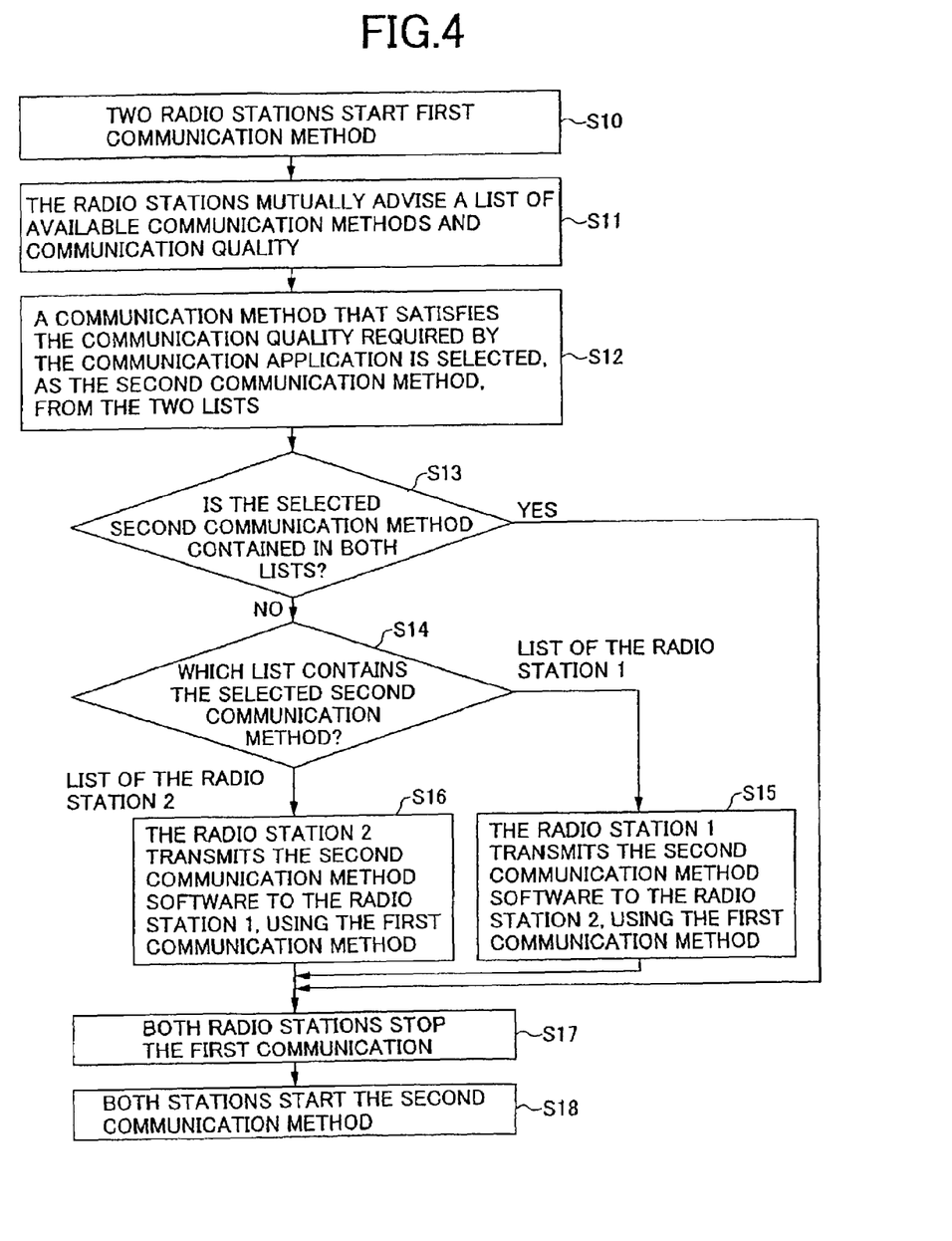
FIG. 4 is a flowchart to describe an operation of the radio communications system shown in FIG. 2.

FIG. 4 shows processing flow performed by the above-mentioned radio communications system.

(1) A communication starts using the first radio communication method

Software of at least one common radio communication method (henceforth the first radio communication method) is installed in the software of the radio communication methods stored in each of the memory units 31 and 41 of the radio stations 30 and 40, respectively. For example, standard software of the radio communication method defined by a radio communications system can be stored beforehand into the memory units 31 and 41 of the radio stations 30 and 40, respectively, as the software of the first radio communication method. Further, the software of the first radio communication method may also be replaced.

The radio station 30 and the radio station 40 start communication according to the first radio communication method described above (S10). Specifically, the following process will be performed.

The radio stations 30 and 40 stay in an initial state (for example, in a standing-by mode and the like) according to the first radio communication method, with the control units 32 and 42 having read the software of the first radio communication method from the memory units 31 and 41, respectively.

Under this situation, if a predetermined communication application chosen by the radio station 30, for example, in order to perform exchange of information with the radio station 40 is started, the control unit 32 will perform processes concerning the communication start according to the software of the first radio communication method described above. Consequently, the radio communication unit 33 of the radio station 30 transmits the information for starting a communication to the radio station 40 according to the first radio communication method. And in the radio station 40 which received the information by the radio communication unit 43, the control unit 42 will start processing a communication start according to the software of the first radio communication method. Consequently, the radio communication unit 43 of the radio station 40 transmits response information concerning the communication start to the radio station 30 according to the first radio communication method.

(2) Selection of the second radio communication method

The radio station 30 and the radio station 40 mutually exchange a list of kinds of radio communication methods with which each station is equipped, and the corresponding communication quality (S11). Specifically, following process will be performed.

In the radio station 30 that received the response information for the above-mentioned communication start from the radio station 40, the control unit 32 acquires the communication quality which the communication application started as mentioned above requires from the communication application list (refer to FIG. 2) that is stored into the memory unit 31. Further, the control unit 32 acquires the radio communication method list (refer to FIG. 3) indicating the radio communication method which the radio station 30 concerned can use and the communication quality thereof from the memory unit 31. And based on control of the control unit 32, the radio communication unit 33 transmits the information that identifies the started communication application, the communication quality which the communication application requires, and the above-mentioned radio communication method list to the radio station 40 according to the first radio communication method described above.

On the other hand, in the radio station 40 that receives the information for the above-mentioned communication start from the radio station 30, the control unit 42 acquires the radio communication method list (refer to FIG. 3) showing the radio communication method which the radio station 40 can use, and the communication quality thereof from the memory unit 41. And based on control by the control unit 42, the radio communication unit 43 transmits the radio communication method list to the radio station 30 according to the first radio communication method.

By the communication according to the first radio communication method between the above radio stations 30 and 40, the radio station 30 and the radio station 40 mutually acquire the radio communication method list (refer to FIG. 3) with which their respective partner station is equipped. Further, the radio station 40 checks the started communication application based on the information that identifies the communication application transmitted from the radio station 30.

The radio stations 30 and 40 will select a radio communication method, as the second radio communication method, which will satisfy the communication quality that the communication application requires from the radio communication method lists of the own station and the radio communication method list acquired from the respective partner station (S12). Specifically, the following process will be performed.

The control unit 32 of the radio station 30 selects a radio communication method that will satisfy the communication quality required by the started communication application from both of the radio communication method lists, namely, the radio communication method list stored in the memory unit 31 and the radio communication method list received from the radio station 40. Further, the control unit 42 in the radio station 40 selects a radio communication method that will satisfy the communication quality required by the communication application to be started, which is received from the radio station 30 from both the radio communication method list stored in the memory unit 42 and the radio communication method list received from the radio station 30.

A radio communication method that satisfies all conditions of the communication quality (the maximum transmission speed, the maximum transmission delay, the maximum packet, the maximum packet length) will be chosen as the second radio communication method from the both lists, for example, highest transmission speed>=required transmission speed maximum transmission delay<=required transmission delay maximum packet error rate<=required packet error rate maximum packet length>=required packet length.

Where there are two or more radio communication methods that satisfy these conditions, selection as the second radio communication method may be made, for example, in favor of a method that gives the largest difference between the requirement values (required transmission speed and the like) and the values which are available in each item of communication quality (the highest transmission speed and the like) among the two or more radio communication methods. Alternatively, priorities may be attached to each item of the communication quality, for selecting a radio communication method that gives a better value (value which can be offered) in regard of the items with a high priority.

Further, when none of the radio communication methods under both lists satisfies the above-mentioned conditions, a communication method that gives the smallest amount of the differences between the required values and the available values in each item of the communication quality can selected as the radio communication method to be used, or alternatively, a radio communication method that satisfies a high priority item of the communication quality may be selected.

Since the control units 32 of the radio stations 30 and 40 select a radio communication method from the identical list according to the same standards as described above, the same radio communication method will be selected, respectively, as the second radio communication method. Hereafter, the radio communication method chosen as the second radio communication method as mentioned above will be simply called the second radio communication method.

(3) Transmission of the software of the second radio communication method

The control units 32 and 42 of the radio stations 30 and 40 determine whether the second radio communication method mentioned above is available in both the above-mentioned lists (S13). When the second radio communication method is available only in one of the above-mentioned lists (NO at S13), each of the control units 32 and 42 further determines which one of the lists contains the second radio communication method (S14).

Here, when the second radio communication method is available in the radio communication method list of the radio stations 30 (refer to FIG. 3) (List of the radio station 1 in S14), the control unit 32 of the radio station 30 reads the software of the second radio communication method from the memory unit 31. And based on the control by the control unit 32, the radio communication unit 33 transmits the read software to the radio station 40 according to the first communication method described above (S15). The control unit 42 of the radio station 40 determines that the software of the second radio communication method is not stored in its own station (List of the radio station 1 in S14), and stores the software of the second radio communication method that is received from the radio station 30 by the radio communication unit 43 into the memory unit 41. And based on the control by the control unit 42, the radio communication unit 43 transmits a confirmation signal to the radio station 30. By receiving this confirmation signal, the radio station 30 can recognize that the radio station 40 has been equipped with the software of the second radio communication method described above.

On the other hand, when the second radio communication method is available in the radio communication method list of the radio station 40 (List of the radio station 2 in S14), the control unit 42 of the radio station 40 reads the software of the second radio communication method from the memory unit 41. And based on the control by the control unit 42, the radio communication unit 42 transmits the read software to the radio station 30 according to the above-mentioned first communication method (S16). The control unit 32 of the radio station 30 determines that the software of the second radio communication method is not stored in its own station (List of the radio station 2 in S14), and then, receives the software of the second radio communication method by the radio communication unit 33 from the radio station 40 and stores it into the memory unit 31. And based on the control by the control unit 32, the radio communication unit 33 transmits a confirmation signal to the radio station 40 according to the above-mentioned first radio communication method. By receiving this confirmation signal, the radio station 40 can recognize that the radio station 30 has been equipped with the software of the above-mentioned second radio communication method.

As described above, when the software of the second radio communication method chosen as the radio communication method that satisfies required communication quality of the communication application to be started is available only in either of the radio stations 30 and 40 that are to communicate, the software concerned is transmitted from the radio station equipped with the software of the second radio communication method to the radio station which is not equipped with the software of the second radio communication method according to the above-mentioned first radio communication method. In this manner, both radio stations 30 and 40 are now equipped with the software of the second radio communication method that is suitable for the communication application to be started.

(4) A communication stop in the first radio communication method

When the above-mentioned second radio communication method is available in both the above-mentioned lists (YES in S13), or after the software of the above-mentioned second radio communication method has been transmitted to the radio stations 30 or 40 (S15 or S16), the radio communication units 33 and 43 will stop communication in the above-mentioned first radio communication method (S17) in each of the radio stations 30 and 40, under the control of the control units 32 and 42, respectively.

(5) A communication start in the second radio communication method

After the communication in the first radio communication method is stopped as mentioned above in each of the radio stations 30 and 40, the control units 32 and 42 in the radio stations 30 and 40, respectively, read the software of the second radio communication method mentioned above from the memory units 31 and 41, respectively. Further, the control unit 42 of the radio station 40 reads the communication application from the memory unit 41, which is the same as the communication application started in the radio station 30, based on the information (refer to process at S11) indicative of the communication application, which has been notified from the radio station 30.

And while the control units 32 and 42 of the radio station 30 and the radio station 40, respectively, process information according to the above-mentioned communication application, the radio communication units 33 and 43 (hardware) are controlled according to the software of the second radio communication method mentioned above. Consequently, exchange (communication) of information by each communication application is performed between the radio station 30 and the radio station 40 according to the second radio communication method suitable for the communication application (via the communication path provided by the second radio communication method mentioned above) (S18).

Although the above-mentioned example has described processes where the radio station 30 first started communication application, the same procedure will take place when the radio station 40 first starts the communication application.

Further, the procedure of the radio communications mentioned above is applicable to radio communications between radio stations in various radio communications systems. For example, when the above-mentioned radio stations 30 and 40 are a base station and a mobile station, respectively, in a mobile communications system, radio communications between the base station and the mobile station according to the procedure mentioned above become possible. Further, the above-mentioned radio stations 30 and 40 may be mobile stations in an ad hoc mobile communication system where the radio communications between the mobile stations according to the procedure mentioned above become possible. Furthermore, the above-mentioned radio station of 30 or 40 may be a relay station that relays between other radio stations (a mobile station, a base station, other relay stations, and the like) in a mobile communications system.

Furthermore, software of a radio communication method with high use frequency is automatically spread into many radio stations within a radio communications system by repeatedly communicating with other radio stations according to the procedure mentioned above.

The radio communication method mentioned above is defined by a set of various parameters (a frequency of the radio wave to be used, a frequency bandwidth, a modulation method, a multiplexing method, a coding/decoding method, an error correction method, a radio channel structure, an information transmission format, a communication protocol to indicate information communication procedure and the like), however, the parameters are not limited to those mentioned above. The present invention is also applicable to a radio communication method proposed by defining a set of new parameters.

Further, although communication quality was used in the above-mentioned example as the standard at the time of selecting a radio communication method suitable for a communication application, it is not restricted thereto. Other standards, such as a user requirement and the like can also be used.

According to this invention, information about radio communication methods with which each of two radio stations is equipped as software is mutually exchanged as described above, the second radio communication method suitable for a communication application is selected using the information acquired by the information exchange, and further, when one of the radio stations is not equipped with the software of the second radio communication method, the software of the second radio communication method is transmitted from a radio station equipped with the second radio communication method to a radio station which is not equipped therewith. In this manner, even if a radio station in a radio communications system is not equipped with software of many radio communication methods beforehand, communications according to various radio communication methods can be performed easily.

What is claimed is:

1. A radio communication method of communication between two mobile stations, comprising the steps of:

mutually exchanging information between said two mobile stations about one or more radio communication methods with which each mobile station is equipped as software by communicating according to a first radio communication method defined beforehand;

selecting a second radio communication method suitable for a communication application to be used for communication between said two mobile stations from among the one or more radio communication methods with which at least one of the two mobile stations is equipped;

identifying, based on the exchanged information about the one or more radio communication methods, one of the two mobile stations that is not equipped with software of the second radio communication method, wherein which one of the two mobile stations is identified as a result of said identifying step varies in response to the exchanged information about the one or more radio communication methods;

transmitting software of the second radio communication method to said one of the two mobile stations identified by said identifying step from another one of the two mobile stations according to said first radio communication method; and conducting communications between said two mobile stations by the communication application according to said second radio communication method based on said software.

2. The radio communication method as claimed in claim 1, wherein said selecting step selects radio communication method that satisfies communication quality required by said communication application as the second radio communication method.

3. The radio communication method as claimed in claim 1, wherein said identifying step checks whether both of the mobile stations are equipped with said second radio communication method or only one of the two mobile stations is equipped with said second radio communication method, and said transmitting step transmits the software of said second radio communication method from said another one of the mobile stations to the identified one of the mobile stations when said another one of the mobile stations determines that only said another one of the mobile stations is equipped with said second radio communication method.

4. The radio communication method as claimed in claim 3, wherein the identified one of the mobile stations acquires the software of said second radio communication method transmitted from said another one of the mobile stations when the identified one of the mobile stations determines that only said another one of the mobile stations is equipped with said second radio communication method.

5. The radio communication method as claimed in claim 3, wherein each of the two mobile stations performs communications by said communication application according to the second radio communication method based on the software already installed when each of the two mobile stations determines that the second radio communication method is provided in both the mobile stations.

6. A mobile station that communicates with another mobile station by a communication application according to a radio communication method by controlling radio communication means that comprises hardware that is independent of radio communication methods, comprising:

memory means to store one or more sets of software of radio communication methods;

information exchange control means to mutually exchange information about one or more radio communication methods installed as software by communicating according to said first radio communication method defined beforehand;

radio communication method selection means to select a second radio communication method suitable for said communication application from radio communication methods available in at least one of the mobile station and said another mobile station;

checking means to check, based on the exchanged information about the one or more radio communication methods, whether said second radio communication method is installed in both the the mobile station and the other mobile station or only one of the mobile station and the other mobile station, and to identify one of the mobile station and the other mobile station that is not installed with the second radio communication method, wherein which one of the mobile station and the other mobile station is identified by said checking means varies in response to the exchanged information about the one or more radio communication methods; and software transmitting control means to read the software of said second radio communication method from said memory means and transmit the same to said another mobile station by said first radio communication method when the checking means determines that said second radio communication method is installed only at the mobile station, wherein communication with the other mobile station by said communication application according to said second radio communication method is conducted by controlling said radio communication means based on the software of said second radio communication method after transmission of the software of said second radio communication method to the other mobile station by said software transmission control means.

7. The mobile station as claimed in claim 6, comprising software acquisition control means to acquire software of said second radio communication method transmitted from the other mobile station when said checking step determined that said second radio communication method is equipped only with the other mobile station, and to store the same into said memory means.

8. The mobile station as claimed in claim 6, comprising controlling said radio communication means based on said software by reading the software of said second radio communication method from said memory means when said second radio communication method is determined available in both the mobile station and the other mobile station by said checking means.

9. The mobile station as claimed in claim 6, wherein said radio communication method selection means selects a radio communication method that will satisfy the communication quality that said communication application requires as the second radio communication method suitable for the communication application concerned.

10. The mobile station as claimed in claim 6, which is used as a mobile station in a mobile ad hoc communication system.

* * * * *

UNITED STATES PATENT AND TRADEMARK OFFICE
CERTIFICATE OF CORRECTION

PATENT NO. : 7,110,752 B2 Page 1 of 1
APPLICATION NO. : 09/926087
DATED : September 19, 2006
INVENTOR(S) : Ichiro Okajima It is certified that error appears in the above-identified patent and that said Letters Patent is hereby corrected as shown below:

On the title page, Item (54), and Column 1, the Title information is incorrect. Item (54) and Column 1 should read:

-- (54) RADIO COMMUNICATION METHOD AND STATION WITH SOFTWARE RECONFIGURATION FEATURES --

Signed and Sealed this

Twenty-eighth Day of November, 2006

JON W. DUDAS
*Director of the United States Patent and Trademark Office*